United States Patent [19]

Kuwabara

[11] Patent Number: 4,778,681
[45] Date of Patent: Oct. 18, 1988

[54] METHOD FOR PRODUCING CANDIED FRUIT AND DRIED FRUIT

[75] Inventor: Keizo Kuwabara, Tokyo, Japan

[73] Assignee: Shinka Shokuhin Co., LTD, Tokyo, Japan

[21] Appl. No.: 865,513

[22] Filed: May 21, 1986

[30] Foreign Application Priority Data

May 21, 1985 [JP] Japan ................... 60-106948

[51] Int. Cl.$^4$ .................................. A23B 7/08
[52] U.S. Cl. ........................... 426/241; 426/242; 426/243; 426/639; 426/640
[58] Field of Search ............. 426/241, 640, 639, 242, 426/243

[56] References Cited

U.S. PATENT DOCUMENTS

| | | | |
|---|---|---|---|
| 2,785,071 | 3/1957 | Mathews | 426/639 |
| 4,041,184 | 8/1977 | Bonacia | 426/639 |
| 4,465,698 | 8/1984 | Bussiere et al. | 426/639 |
| 4,551,348 | 11/1985 | O'Mahony et al. | 426/639 |

FOREIGN PATENT DOCUMENTS

| | | | |
|---|---|---|---|
| 1135239 | 12/1968 | United Kingdom | 426/241 |
| 2121668 | 1/1984 | United Kingdom | 426/639 |

*Primary Examiner*—Donald E. Czaja
*Assistant Examiner*—Mary S. Mims

[57] ABSTRACT

Described is a method for producing a candied fruit, including the steps of immersing in a syrup a natural fruit previously washed with water, peeled and cored, and heating the fruit and the syrup by microwave heating for substituting water and air bubbles in the fruit pulp by the syrup while the fruit remains immersed in the syrup. Also described is a method for producing dried fruit additionally including the step of drying the fruit produced as described above.

7 Claims, No Drawings

METHOD FOR PRODUCING CANDIED FRUIT AND DRIED FRUIT

BACKGROUND OF THE INVENTION

1. Field of the Invention

This invention relates to a method for producing novel candied fruit as well as dried fruit.

2. Related Art Statement

For processing natural fruits for producing the candied fruit (preserved fruit) with long shelf life, it is necessary that the pores or water contained in the fruit be substituted by a syrup, that is, sugar or saccharose solution. As a method for syrup substitution in this manner, it has been known to get the natural fruit immersed in a range of sugar solutions having their sugar concentration increasing sequentially from e.g. the Brix value of 25° to make use of the osmotic presure to permeate the syrup into the fruit pulp, or to boil the natural fruit as it is immersed in the sugar solution.

However, these known methods are inconvenient in that the odor, flavor and tint proper to the natural fruit are lost. In the latter method, inter alia, prolonged processing time is required with the use of the osmotic pressure while, in some fruits, the sugar solution is not permeated sufficiently due to their specific textural composition.

In our Japanease Patent Publication No. 9377-1976, it has been proposed to produce a novel candied fruit having a long shelf life without loss of taste, odor or tint proper to natural fruit by substitution of the pores or water in the dipped fruit pulp by the sugar solution under reduced pressure. According to this proposed method, the natural fruit is washed with water, peeled and cored. The fruit thus processed is immersed in a vacuum tank in which the pressure is reduced for expelling air bubbles contained in the fruit pulp. The sugar solution or syrup is then injected into the tank maintained under reduced pressure. After the end of injection, the pressure within the tank is reset to the atmospheric pressure for permeating the syrup into the fruit pulp. By this proposed method, the processing time can be shortened as compared to the method of simply using the osmotic pressure, while the odor, taste and tint proper to the natural fruit are also kept to some extent.

However, when applied to processing of whole fruits, such as whole apple, to candied fruit, the above described proposed method including vacuum treatment gives rise to a number of inconveniences such that (a) it is difficult to substitute the inside pores or water in the fruit pulp at one time by the sugar solution of a predetermined concentration;

(b) because of considerable volumetric changes encountered during the manufacture process, it is difficult to control the sugar content or concentration in the ultimate product;

(c) considerable syrup wastage is encountered; and (d) the productive efficiency is also low on account of an excessive number of production steps.

On the other hand, when desired to dry the thus obtained candied fruit for producing dried fruit, it is desired that the substitution syrup be rather high in sugar concentration for maintaining good taste of dried fruit. However, it is not possible with the conventional methods to substitute the inside pores or water in the fruit pulp with the syrup having the Brix value higher than 50° and thus a prolonged drying time is required in order to reach the desired sugar content. In addition, the resulting dried fruit is generally poor in palatability or tint.

SUMMARY OF THE INVENTION

The present invention has been proposed in order to obviate the inconveniences of the above described conventional methods. It is therefore an object of the present invention to provide a method whereby the pores or water in the fruit pulp can be substituted at one time by the syrup having a predetermined sugar concentration.

It is another object of the present invention to provide a method whereby the inside pores or water contained in the fruit can be substituted at one time by the syrup of a predetermined concentration even if the whole natural fruit is used.

It is another object of the present invention to provide a method for producing candied fruit whereby the sugar content of the ultimate product can be controlled easily and whereby the candied fruit with good homogeneity, odor, taste and tint can be produced.

It is another object of the present invention to provide a method for producing candied fruit excellent in productive efficiency and in which syrup wastage is minimized.

It is another object of the present invention to provide a method for producing dried fruit having good taste and higher sugar content.

The present inventor has conducted eager researches in order to achieve these objects and found that microwave heating as known per se can be advantageously employed as an artifice for substitution of the pores or water in the fruit pulp by the syrup or sugar solution. This finding has been the basis of the present invention which is characterized in that the natural fruit previously washed with water, peeled and cored is immersed in the syrup and heated by microwave heating with the syrup, the fruit being kept in the thus immersed state to permit the pores or water in the fruit pulp to be substituted by the syrup, and also characterized in that the candied fruit thus obtained is dried to produce the dried fruit.

DESCRIPTION OF THE PREFERRED EMBODIMENT

For preparing candied fruit in accordance with the present invention, the natural fruit which is to be the starting material is washed with water, peeled and cored. The natural fruit may be cut into smaller pieces or used as whole fruit. The kind of the natural fruit also is not limitative and, for example, apples, pears, peaches, pineapples, Chinese quinces and chestnuts, may be used as desired.

The fruit is dipped in saline water to prevent it from fading. The concentration of saline water is in the range of 0.5 to 2.0% sodium chloride (refined salt). In addition to sodium chloride, the saline water may contain 0.5 to 2.0 wt.% of L-ascorbic acid (vitamin C) and 0.5 to 2.0 wt.% of organic acid such as citric acid.

The natural fruit thus pre-treated is immersed in syrup and the water or air bubbles in the fruit pulp is substituted by the syrup by microwave heating.

The sugar content of the syrup to be in use can be set to a value as computed from the weight and sugar content of the natural fruit, the sugar content as required in the ultimate product, and the amount of the syrup used. In accordance with the present invention, the sugar content can be set to the theoretical value at this stage since there is no necessity for exchanging the syrup during processing so that syrup wastage may be avoided. The sugar content of the syrup can be selected to a higher value. According to our experiments, the syrup with the Brix value of higher than 50° may be used for substitution as described above. It is noted that any kind of sugar can be used insofar as it is used for this kind of candied fruit. There is no limitation on the kind of the saccharose to be used insofar as it is commonly used for the preparation of this kind of candied fruit. For example, sugar such as granurated sugar, soft sugar, fine granurated sugar, black sugar, cube sugar or crystal sugar, starch sugar such as sugar alcohol, sucrose, maltose, acid-saccharified millet jelly, enzyme-saccharified millet jelly, natural sweetening or artificial sweetening, may be used.

The natural fruit thus immersed in the syrup is subjected to microwave heating for promptly expelling pores in the fruit pulp.

In microwave heating, electric waves with the wavelength of 1 m to 1 cm or the frequency of 300 MHz to 30 GHz are applied to the foodstuff material so that the organic molecules that make up the material will be forced into intence vibrational or rotational movement in an effort to orient themselves in the electric field thereby internally heating the foodstuff material. Usually, the microwave with the frequency of 915 MHz or the frequency of 2450 MHz is used. The processing time by the microwave heating is preferably lesser than 10 minutes. Above all, the time required until ebullition of the syrup or fruit is preferably lesser than about 3 to 5 minutes. The fruit pulp texture may be altered by too long a processing time. In accordance with the aforementioned microwave heating, both the outside and the inside of the fruit pulp are uniformly elevated in the temperature under the principle of high frequency induction heating so that air in the fruit pulp can be expelled in a shorter time even when the whole fruit is used. The microwave heating is also effective to deactivate oxidase to thereby prevent the fruit pulp from changing to brownish tint while simultaneously sterilizing the fruit. Conversely, with the use of the heat source such as hot air, steam or electricity, the inside of the fruit pulp is elevated only gradually by heat conduction so that the minute pores on the outer side of the fruit pulp are collapsed to make it more difficult to expel air bubbles from the inside of the fruit pulp. Occasionally, the fruit pulp texture tends to be collapsed due to the prolonged heating time to make it more difficult to maintain the status of the whole fruit.

After termination of the microwave heating in the syrup as mentioned hereinabove, the fruit is maintained in the immersed state in the syrup, thereby allowing the inside pores or moisture in the fruit pulp to be promptly substituted by the syrup. For maintaining the fruit in the immersed state in the syrup, any mechanical means such as cover in the form of the wire mesh may be used for pushing down the fruit into the syrup. As an alternative measure, the fruit may be charged along with the syrup into the vessel which then is sealed hermetically. In this case, the candied fruit can be directly supplied as ultimate product.

By using the aforementioned process, the candied fruit can be prepared very easily with the predetermined sugar content. In this case, substitution can be acheved once and for all with the syrup having the theoretical sugar content without the necessity of discharging or exchanging the used syrup, thus assuring highly aromatic odor, which is not lost in vain to the outside.

It will be noted that the candied fruit prepared by the aforementioned method can be used for preparing the dried fruit in a shorter processing time. For example, when using the fruit substituted by the microwave heating by the syrup and having the sugar content of higher than 50° in terms of Brix value, dried fruit having good taste and higher sugar content can be prepared by drying with conventional drying means for a shorter time.

The drying means may include spontaneous drying, hot air drying, far infrared heating, or microwave heating.

In spontaneous drying, dried articles can be obtained by utilizing natural environment such as solar heat, wind or cold air and thus without the necessity of employing any special equipment.

In hot air drying, an artificially generated hot air is compulsorily directed to the articles to be dried. The hot air drying systems include box-shaped shelf type, belt or band type or tunnel type systems.

In far infrared heating, far infrared rays are used for heating and drying. Since the internal heating can be promoted by radiation heat of the far infrared rays, the inside and outside temperature of the heated zone are equalized so that drying can be completed within a shorter time than in the case of hot air drying.

In microwave heating, the surface and the interior of the fruit can be heated almost simultaneously even if the fruit is of a larger size so that a large amount of moisture is vaporized in a shorter time.

The drying time necessary for any of these drying means can be shortened since the sugar content of the candied fruit used as the starting material can be elevated by the preceding microwave heating intended for substitution of the air bubbles or moisture in the fruit pulp, so that highly palatable dried fruit is produced. Above all, the shortened drying time results in improved tint of the dried fruit. For example, while the sweetening typified by sucrose tends to be changed to a brownish tint on heating, such changes in tint can be inhibited by elevating the sugar content of the fruit and thereby shortening the heating time for drying.

It is seen from the foregoing that, since the air bubbles or water contents in the fruit pulp are substituted by the syrup by microwave heating, the candied fruit with exellent odor, taste and tint can be produced with the high efficiency within a shorter time and by a simplified manufacture process.

Since the substitution can be effected with the syrup of the predetermined sugar content by one step operation even if the sugar content is high, the candied fruit having a constant desirable quality and an improved aromaticity can be obtained without loss of ordor or syrup wastage.

In addition, the candied fruit thus substituted by the syrup by microwave heating can be dried to produce a highly palatable fruit superior in taste and tint within a shorter manufacture time.

The present invention will be explained with reference to a certain specific Example and Comparative Examples. It should be noted that these Examples are given by way of illustration only and are not intended for limiting the scope of the invention.

EXAMPLE

A whole apple weighing 180 to 220 g was washed with water and the thus washed whole apple was peeled, cored and dipped in 0.5% saline solution.

A syrup twice the amount by volume of the fruit pulp was added to the apple and the apple thus immersed in the syrup was heated by microwave heating, the syrup having the sugar content as calculated from that of the ultimate product. For this microwave heating, the output was adjusted so that the time until ebullition was about 5 minutes and the total heating time was less than 10 minutes. The microwave used was of the frequency of 2450 MHz.

After the end of microwave heating, both the fruit pulp and the syrup thus heated by microwave heating were introduced into a container into which an amount of syrup having the same sugar contentas that of the ultimate product was additionally charged so that the sum of the weight of the solid content and that of the syrup was maintained at a constant value.

After tightly sealing the container, the outside of the container was sterilized at 85° C. for 15 minutes and cooled with water.

In the course of the above described sequence of operations, changes in the yield by volume and the sugar content in the apple pulp in the respective process steps for the sugar contents of the ultimate product in terms of the Brix value of 20° to 50° were checked. The results are shown in the following Table 1.

TABLE 1

| Process | Bx setting | | | | | | | |
|---|---|---|---|---|---|---|---|---|
| | Bx20 | | Bx30 | | Bx40 | | Bx50 | |
| | sugar content | yield | sugar content | yield | sugar content | yield | sugar content | yield |
| fruit pulp after peeling and coring | 11 | 100 | 11 | 100 | 11 | 100 | 11 | 100 |
| fruit pulp after microwave heating | 16 | 72 | 19 | 68 | 20 | 67 | 21 | 67 |
| fruit pulp after sterilizing and cooling 1st day | 20 | 110 | 28 | 92 | 34 | 85 | 40 | 80 |
| 2nd day | 20 | 111 | 30 | 98 | 40 | 96 | 50 | 89 |
| 3rd day | 20 | 111 | 30 | 105 | 40 | 103 | 50 | 100 |

It is seen from this Table that, in case of syrup substitution by microwave heating, the rate of increase in the sugar content to that of the desired ultimate product is faster while the yield recovery percentage is also optimized. This tendency was not changed when the sugar content of the ultimate product was 20° in term of the Brix value.

COMPARATIVE EXAMPLE 1

A whole apple weighing 180 to 220 g was washed with water and the whole fruit thus processed was peeled and cored. After peeling and coring, the fruit was dipped in 0.5% saline solution.

The fruit was then immersed in water as deaerating liquid and deaerated for 15 minutes under the reduced pressure of 1 to 10 mmHg. Then, the pressure was reset to atmospheric and immersion continued for 30 minutes.

Then the fruit was immersed in an amount of syrup four times by volume of the fruit pulp (Brix value: 40°) and boiled for 15 minutes.

Then the fruit pulp and the syrup were charged into a container so that the sum of the fruit pulp and the syrup by weight has a constant value and the container was sealed tightly. The outerside of the container was sterilized at 85° C. for 15 minutes and cooled by water.

It is noted that the ratio of the fruit pulp to syrup was 1:2 at this time and sugar content of the makeup syrup was calculated at this time on the basis of the sugar content of the ultimate product.

In the course of the above described sequence of operation, changes in the yield by volume and the sugar content in the fruit pulp in the respective steps were checked. The results are shown in the following Table 2.

TABLE 2

| Process | Bx setting | | | | | | | |
|---|---|---|---|---|---|---|---|---|
| | Bx20 | | Bx30 | | Bx40 | | Bx50 | |
| | sugar content | yield | sugar content | yield | sugar content | yield | sugar content | yield |
| fruit pulp after peeling and coring | 11 | 100 | 11 | 100 | 11 | 100 | 11 | 100 |
| fruit pulp after deaerating and immersion | 8.5 | 130 | 8.5 | 130 | 8.5 | 130 | 8.5 | 130 |
| fruit pulp after boiling | 14 | 90 | 14 | 90 | 14 | 90 | 14 | 90 |
| fruit pulp after sterilizing and cooling 1st day | 18 | 105 | 23 | 85 | 30 | 58 | 38 | 50 |
| 2nd day | 20 | 105 | 28 | 90 | 37 | 70 | 45 | 60 |
| 3rd day | 20 | 105 | 30 | 100 | 38 | 80 | 48 | 65 |

It is seen from this Table 2 that, when the water is used as deaerating liquid and the syrup substitution is caused to occur under reduced pressure, syrup substitution may take place with good yield recovery percentage for the syrup for the lower concentration, but it becomes more difficult to produce the candied fruit with good yield recovery percentage in the case of using a syrup of a higher concentration (Brix 40°) while it takes a rather long time in this case until a predetermined sugar content is reached.

COMPARATIVE EXAMPLE 2

The candied fruit was produced by using the method similar to that of Comparative Example 1 except that the syrup with the Brix value equal to 20° was used as the deaerating liquid.

In the course of the process as described in the Comparative Example 1, changes in the yield by volume and sugar content in the apple pulp in the respective process steps were checked. The results are shown in the following Table 3.

TABLE 3

| Process | | Bx setting | | | | | | |
|---|---|---|---|---|---|---|---|---|
| | | Bx20 | | Bx30 | | Bx40 | | Bx50 | |
| | | sugar content | yield | sugar content | yield | sugar content | yield | sugar content | yield |
| fruit pulp after peeling and coring | | 11 | 100 | 11 | 100 | 11 | 100 | 11 | 100 |
| fruit pulp after deaerating immersion | | 8.5 | 130 | 8.5 | 130 | 8.5 | 130 | 8.5 | 130 |
| fruit pulp after boiling | | 14 | 90 | 14 | 90 | 14 | 90 | 14 | 90 |
| fruit pulp after sterilizing and cooling | 1st day | 18 | 105 | 23 | 85 | 30 | 58 | 38 | 50 |
| | 2nd day | 20 | 105 | 28 | 90 | 37 | 70 | 45 | 60 |
| | 3rd day | 20 | 105 | 30 | 100 | 38 | 80 | 48 | 65 |

It is seen from this Table 3 that, when the syrup with the Brix value of 20° was used as the deaerating liquid and the substitution was caused to occur under reduced pressure, the water or air bubbles contained in the fruit pulp after deaeration and immersion can be substituted only insufficiently by the syrup, while the yield recovery percentage is also lowered.

What is claimed is:

1. A method of producing fruit preserve, comprising the steps of:

immersing a natural fruit previously washed with water, peeled and cored, in a fixed amount of syrup having a predetermined sugar content; the fixed amount being based on the weight and sugar content of the natural fruit, and the predetermined sugar content of the syrup corresponding to that desired in the fruit preserve;

heating the natural fruit and the syrup by microwave heating to thereby expel water and air contained in the natural fruit therefrom and replace the same by syrup; and sealing the heated fruit and the syrup in a container.

2. A method of producing dried fruit comprising the steps of:

immersing a natural fruit previously washed with water, peeled and cored, in a fixed amount of syrup having a predetermined sugar content; the fixed amount being based on the weight and sugar content of the natural fruit, and the predetermined sugar content of the syrup corresponding to that desired in the dried fruit;

heating said natural fruit and the syrup by microwave heating to thereby expel water and air contained in the natural fruit therefrom and replace the same by syrup;

discarding excess syrup; and drying the heated fruit.

3. A method according to claim 1 or 2, wherein the sugar content of the syrup ranges from 20° to 50° in terms of the Brix value.

4. A method according to claim 1 or 2, wherein the natural fruit is the natural whole fruit peeled and cored while in the whole state.

5. A method according to claim 1 or 2, wherein microwave heating is effected with a frequency of 915 MHz or 2450 MHz.

6. A method according to claim 1 or 2, wherein the fruit and syrup are microwave heated for less than 10 minutes.

7. A method according to claim 2, wherein the fruit is dried by spontaneous drying, hot air drying, infrared heating, or microwave heating.

* * * * *